US008882402B2

(12) United States Patent
Hoffer

(10) Patent No.: US 8,882,402 B2
(45) Date of Patent: Nov. 11, 2014

(54) ANTI-ROTATION MOUNTING MECHANISM FOR A ROUND INSERT

(75) Inventor: Brad Daniel Hoffer, White, PA (US)

(73) Assignee: Kennametal Inc., Latrobe, PA (US)

( * ) Notice: Subject to any disclaimer, the term of this patent is extended or adjusted under 35 U.S.C. 154(b) by 125 days.

(21) Appl. No.: 13/301,945

(22) Filed: Nov. 22, 2011

(65) Prior Publication Data

US 2013/0129436 A1    May 23, 2013

(51) Int. Cl.
B23C 5/22 (2006.01)
(52) U.S. Cl.
CPC ......... *B23C 5/2221* (2013.01); *B23C 2200/045* (2013.01); *B23C 2200/167* (2013.01); *B23C 2210/168* (2013.01); *B23C 2200/168* (2013.01)
USPC ................... 407/34; 407/40; 407/42; 407/113
(58) Field of Classification Search
CPC ................... B23C 2210/163; B23C 2210/168; B23C 2200/045
USPC ................ 407/42, 47, 48, 61, 113, 33, 34, 40
IPC .................................................. B23C 5/22, 5/20
See application file for complete search history.

(56) References Cited

U.S. PATENT DOCUMENTS

| 4,512,689 | A | * | 4/1985 | Bylund | 407/40 |
|---|---|---|---|---|---|
| 4,679,968 | A | * | 7/1987 | Tsujimura et al. | 407/114 |
| 6,164,878 | A | | 12/2000 | Satran et al. | |
| 6,234,724 | B1 | * | 5/2001 | Satran et al. | 407/43 |
| 6,238,133 | B1 | | 5/2001 | DeRoche et al. | |
| 7,908,945 | B2 | | 3/2011 | Dufour et al. | |
| 2004/0165961 | A1 | * | 8/2004 | Nagaya et al. | 407/113 |

FOREIGN PATENT DOCUMENTS

| DE | 60211187 | T2 | | 2/2007 |
|---|---|---|---|---|
| EP | 300172 | A2 | * | 1/1989 |
| EP | 2364804 | A1 | | 9/2011 |
| JP | 04300114 | A | * | 10/1992 |
| JP | 2007210090 | A | * | 8/2007 |
| JP | 2011206904 | A | * | 10/2011 |
| JP | 2011245585 | A | * | 12/2011 |

OTHER PUBLICATIONS

Sep. 18, 2013—K-4058USDE1—Official_Action from corresponding patent application.

* cited by examiner

*Primary Examiner* — Daniel Howell
(74) *Attorney, Agent, or Firm* — Larry R. Meenan, Esq.

(57) ABSTRACT

An anti-rotation mounting mechanism is provided between an indexable insert and an insert-receiving pocket in the body of a machine tool, such as a milling cutter. The mechanism includes a plurality of curved stop surfaces uniformly disposed around the side surface of the insert, a portion of which is obliquely oriented with respect to the side surface of the insert, and an anti-rotation feature in the pocket of the tool body having a pair of engagement portions that are substantially complementary in shape to that of the stop surfaces for forming an interference joint between the pocket and the insert. The anti-rotation feature further includes a central planar portion that does not engage the stop surfaces. The mechanism effectively prevents rotation between the insert and pocket without the formation of point-type, localized stresses which can chip or break the insert.

15 Claims, 5 Drawing Sheets

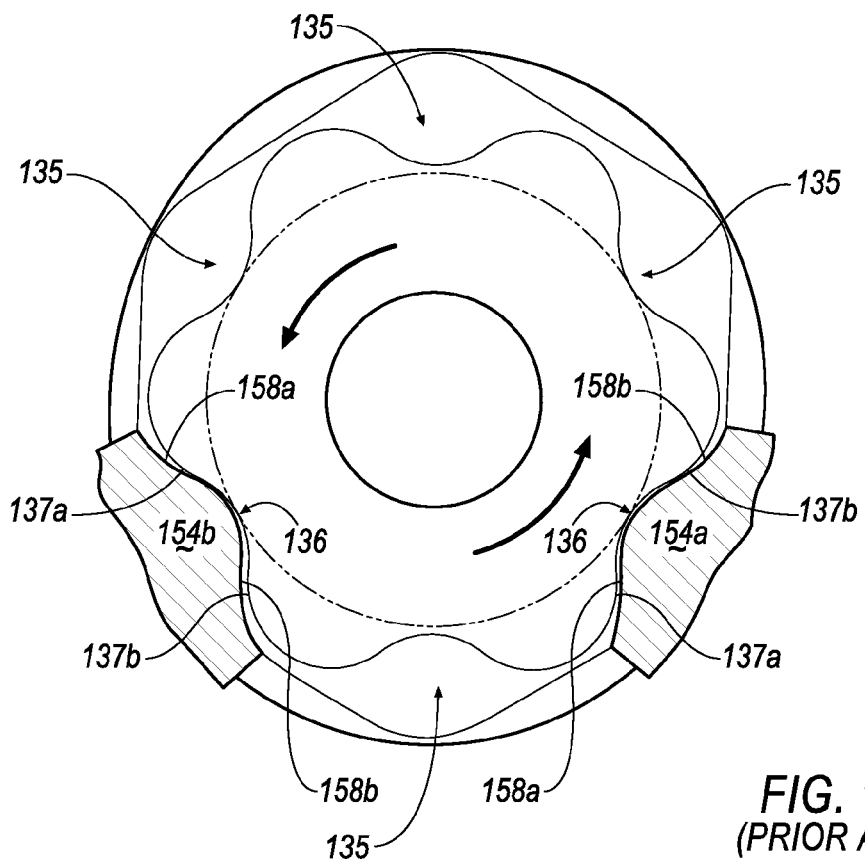
FIG. 10
(PRIOR ART)
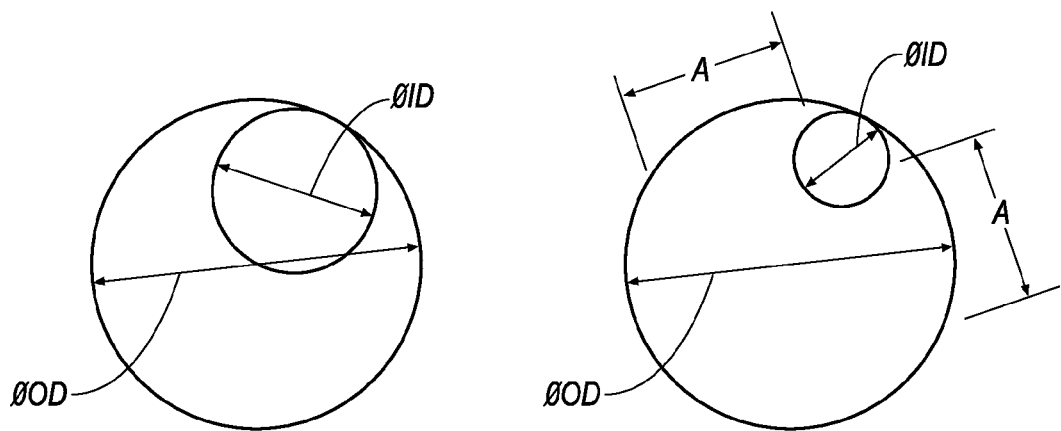
FIG. 11
(PRIOR ART)
FIG. 12
(PRIOR ART)

ions can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

ANTI-ROTATION MOUNTING MECHANISM FOR A ROUND INSERT

BACKGROUND OF THE INVENTION

The invention generally relates to mounting mechanisms for cutting inserts, and is particularly concerned with a mechanism for preventing the rotation of a round cutting insert mounted onto the body of a cutting tool.

The inserts used in tools such as milling cutters are mounted in complementarily-shaped pockets spaced around the periphery of the tool body. The inserts are typically secured within their respective pockets by clamping screws inserted through a hole provided in the center of the insert. During a cutting operation, such inserts often experience not only compressive and vibratory forces, but some amount of torque due to the angle between the cutting edges of the inserts and the workpiece. For cutting inserts of non-round shapes, such torque does not result in the rotation of the insert due to the interference-type fit between the angled sidewalls of such inserts and the complementarily-shaped walls of the pocket that receive them. By contrast, round inserts can rotate within their respective pockets since no such mechanical interference naturally arises between the cylindrical or frustro-conical sidewalls of round inserts and the circular walls of the pockets which receive them. The resulting rotation can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

To prevent such unwanted rotation, several anti-rotation mechanisms have been developed in the prior art. In one such mechanism, a plurality of deep semicircular recesses are provided around the sidewall of the insert. A pin is provided adjacent to the sidewall of the insert-receiving pocket in the tool body that is complementary in shape to the recesses around the insert. In operation, the insert is installed in the pocket of the milling cutter or other tool with the pin of the pocket inserted into one of the semicircular recesses of the insert. During use, the insert is indexed to even out the wear on its cutting edges by periodically removing it from the pocket, partially rotating it, and reinstalling it so that the pin is received by a different recess. In another type of anti-rotation mechanism, a polygonal pattern of facets are provided around the circular sidewall of the insert. Such a mechanism is disclosed in U.S. Pat. No. 5,346,336. The insert-receiving pocket is provided with a complementarily-shaped pattern of polygonal walls for receiving the facets of the insert. The indexing of the insert is performed generally in the same manner as described in the first mechanism.

Unfortunately, a number of shortcomings associated with each design have been noticed. For example, the applicants have observed that, with respect to the first design, the edges of the full radius, semicircular recesses formed in the hard, carbide material of the insert can slowly cut the steel pin in the pocket as the result of vibrations between the pin and the edge of the recess, which is oriented substantially orthogonally with respect to the axis of the pin. Additionally, the provision of such deep recesses around the bottom of the insert body result in an undesirable weakening of the insert body as a result of the removal of the material necessary to form the recesses. The stop mechanism disclosed in the '336 patent likewise has shortcomings, albeit different ones. For example, the facets provided around the body of the insert are angled at a slightly steeper angle than the flat walls provided around the insert-receiving pockets to avoid contact between the walls of the pocket and the weaker, bottom portion of the insert. However, the limited contact provided by such a design can result in one-point contact between the edges of the insert facets and the flat walls of the pocket. Moreover, because the only contact between the insert and the pocket is along the upper portion of the insert, this relatively small area of the insert must absorb all the stresses generated between the insert and the pocket when the insert cuts a workpiece. Hence the limited and sometimes one-point contact between the insert and the pocket can result in localized chipping, cracking, or breakage of the insert over time.

To overcome these shortcomings, U.S. Pat. No. 6,238,133 describes an anti-rotation mechanism 100 having complimentary curved surfaces on both the cutting insert and the insert pocket. The operation of the anti-rotation mechanism 100 may best be understood with respect to FIGS. 8, 9, and 10. While the curvature between the stop surfaces 135 of the insert 103 and the anti-rotation surface 136 of the pocket 105 is substantially complementary, the two surfaces are deliberately spaced apart a distance, D, which is typically a few thousandths of an inch (see in particular FIG. 9). Such a small gap between the two surfaces 135, 136 allows the insert 103 to rotate an angle of between 1° and 10° after the insert 103 has been clamped into the pocket 105. Such a small latitude of rotational movement (i.e. a clocking) allows one of the oblique engagement portions 137$a,b$ of the stop surfaces 135 to come into contact with one of the engagement portions 158$a,b$ of the anti-rotation surface 136, as is illustrated in FIG. 10. The relatively gently sloping, large partial radius curves that define the stop surfaces 135 and anti-rotation surfaces 136 advantageously results in broad line or lenticular contact between the insert 103 and the nibs 154$a,b$.

Referring now to FIGS. 11 and 12, the interaction between the stop surfaces 135 and the nibs 154$a,b$, can be explained by two circles; one circle with an inner diameter (I.D.) and one circle with an outer diameter (O.D). Now, move the I. D. until it touches the O.D. If the radius of the I.D. is reduced by a certain ratio, then it's location must be moved by the same ratio so that it will still touch the O.D. By doing this, it increases the remaining distance between the I.D. and the O.D. (dimension A). Unfortunately, this increased distance allows more rotational movement (i.e., clocking) of the cutting insert 103.

SUMMARY OF THE INVENTION

Clearly, what is needed is anti-rotation mechanism for round inserts that effectively prevents such inserts from rotating while minimizing rotational movement of the cutting insert when mounted in the insert-receiving pocket. Ideally, such a anti-rotation mechanism should be relatively easy to integrate into conventional insert and pocket structures. Finally, such a mechanism should be substantially independent from the main interface between the pocket walls and the insert that supports the insert during a cutting operation.

The invention has solved the problems associated with conventional anti-rotation mechanisms by providing a central planar portion on the anti-rotation surface of the insert-receiving pocket.

In one aspect, the invention comprises an anti-rotation mounting mechanism between a round cutting insert and an insert-receiving pocket of a tool body. The insert includes an upper surface that terminates in a cutting edge, a lower surface, and a side surface between said upper and lower surfaces. The anti-rotation mechanism comprises a plurality of curved stop surfaces disposed around the side surface; and an anti-rotation feature in the insert-receiving pocket of the tool body for engaging the stop surfaces to form an interference joint. The anti-rotation feature includes a pair of curved engagement portions separated by a planar central portion, wherein the stop surfaces engage the engagement portions of the anti-rotation feature to form an interference joint, and wherein the stop surfaces do not engage the planar central portion of the anti-rotation feature.

In another aspect, the invention comprises an anti-rotation mounting mechanism between a round cutting insert and an insert-receiving pocket of a tool body. The insert includes an upper surface that terminates in a cutting edge, a lower surface, and a side surface between said upper and lower surfaces. A plurality of curved stop surfaces are disposed around the side surface of the insert, each stop surface including a pair of oblique engagement portions and a central portion therebetween. An anti-rotation feature is formed in a side surface of the pocket of the tool body, the anti-rotation feature including a pair of engagement portions separated by a central planar portion, wherein the engagement portions of the anti-rotation feature engage the oblique engagement portions of the stop surfaces to form an interference joint, and wherein the central planar portion does not engage the stop surfaces of the insert.

In order to prevent the removal of a weakening amount of material from the insert, the rounded stop surfaces are tapered relative to the side surfaces of the insert; i.e., the stop surfaces increase in depth between the upper and lower surfaces of the insert such that sidewalls of the insert appears to be scalloped in a continuous sinusoidal pattern. Additionally, in order to equalize stresses between the insert walls and pocket walls, the pocket preferably includes two anti-rotation surfaces for simultaneously engaging two of the rounded stop surfaces of the insert. Finally, the anti-rotation surface is preferably located on a lower portion of the pocket sidewalls, and the upper portion of these sidewalls engages an upper portion of the insert sidewall to provide the primary support between the insert and the pocket.

The obliquely oriented, inter-fitting surfaces defined by the partial radius curves around the insert sidewalls and the sidewalls of the pocket provide an interference joint characterized by either a broad line-type or lenticular-surface type contact between the insert and the pocket in the tool body, avoiding localized point-type stresses which could either chip or crack the insert body or create wear patterns in the walls of the insert-receiving pocket. The contact between the upper sidewalls of the pocket and the insert substantially insulates the interference joint created by the stop and anti-rotation surfaces from the load applied between the insert and the pocket as a result of a cutting operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 10 is a bottom view of the insert of FIG. 8B mounted in the pocket of FIG. 8A;

FIG. 11 is a schematic view of the interaction principle between the curved anti-rotation surface of FIG. 8B and the curved stop surface of the insert of FIG. 8A; and FIG. 12 is another schematic view of the interaction principle between the curved anti-rotation surface of FIG. 8B and the curved stop surface of the insert of FIG. 8A.

DETAILED DESCRIPTION OF THE INVENTION

Figure 1:
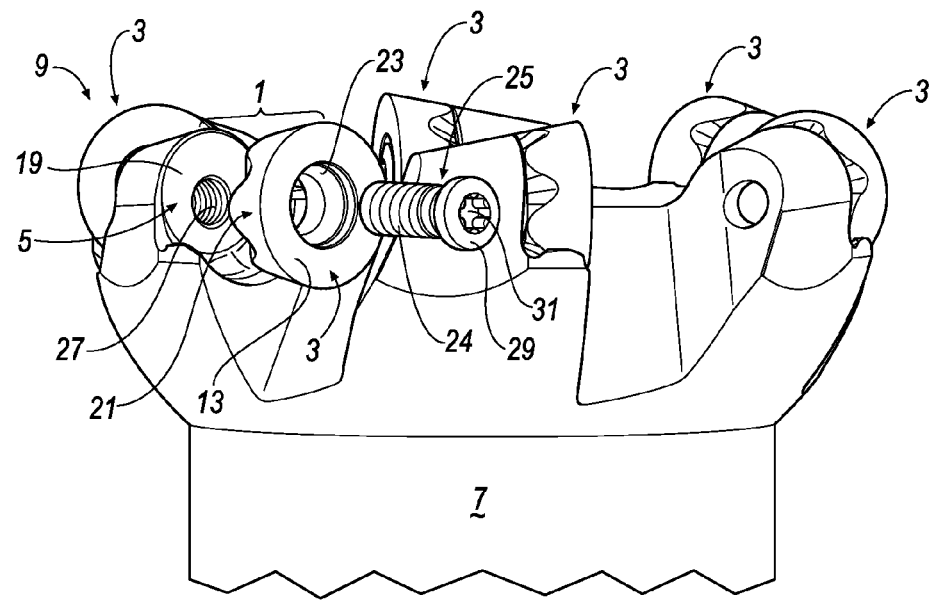
FIG. 1 is a perspective, exploded view of a milling cutter incorporating the anti-rotation mounting mechanism of the invention.
Figure 2A:
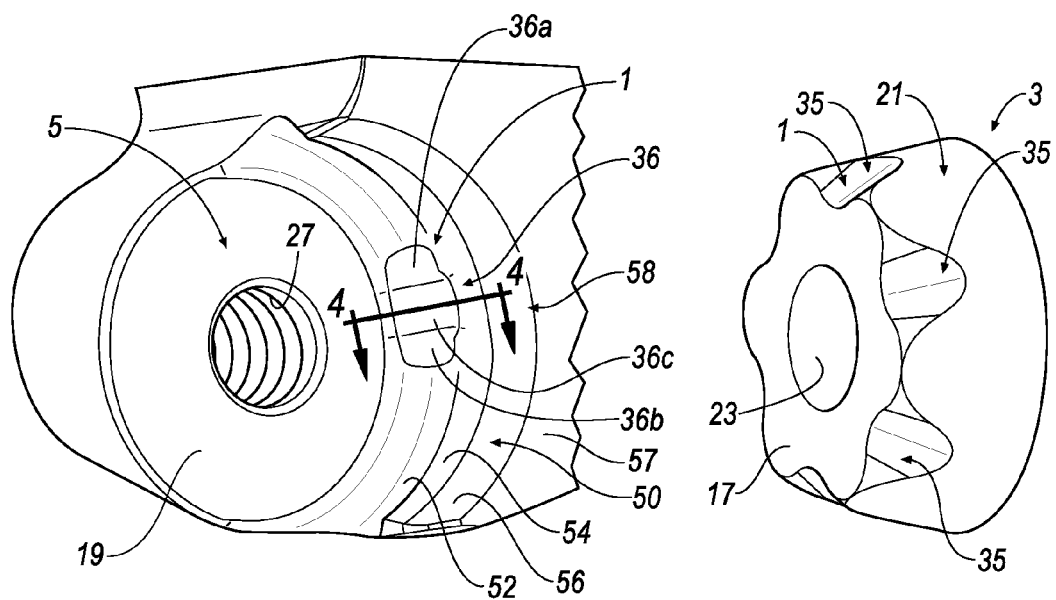
FIGS. 2A and 2B are perspective views of both the insert-receiving pocket and the cutting insert used in the milling cutter of FIG. 1, illustrating the complementary anti-rotation surfaces that form the mechanism of the invention.
Figure 2B:
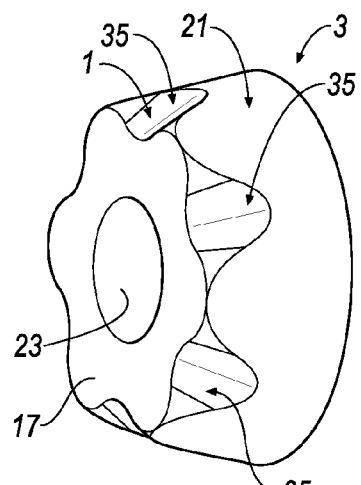
Figure 3:
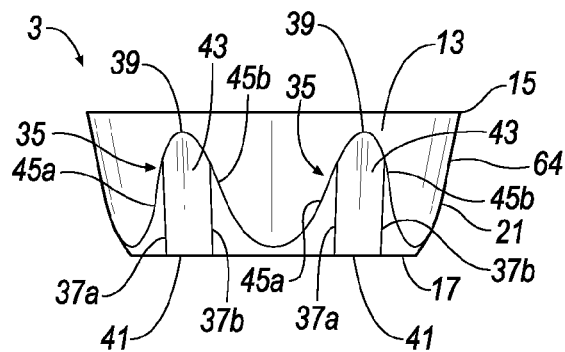
FIG. 3 is a side view of the insert illustrated in FIG. 2B illustrating the curved stop surfaces integrated around the sidewall of the insert.

With reference now to FIGS. 1, 2, and 3, wherein like numerals designate like components throughout all of the several Figures, the anti-rotation mounting mechanism 1 of the invention serves to prevent a round insert 3 from rotating within a pocket 5 present in the body 7 of a milling cutter 9 or other cutting tool. The insert 3 has an upper surface 13 that terminates in a circular cutting edge 15, and a bottom surface 17 that engages the floor 19 of the pocket 5 when the insert 3 is mounted onto the body 7 of the cutter 9. The insert 3 further has a frustro-conical sidewall 21 interconnecting the upper surface 13 and bottom surface 17. A screw hole 23 is centrally disposed through the body of the insert 3 for receiving the threaded shank of a clamping screw 25. The threaded shank 24 is screwed into a threaded bore 27 centrally located in the floor 19 of the pocket 5 in order to secure the insert 3 onto the body 7 of the milling cutter 9. To this end, the clamping screw 25 includes a screw head 29 with a wrench-receiving recess 31 as shown.

With reference now to FIGS. 2A, 2B, and 3, the mounting mechanism 1 of the invention generally comprises a plurality of curved stop surfaces 35 uniformly disposed around the frustro-conical sidewall 21 of the insert 3 in combination with a mating anti-rotation surface 36 in the sidewall of the insert-receiving pocket 5. In the illustrated embodiment, the stop surfaces 35 are concave, while the engagement portions of the anti-rotation surface 36 are convex. As will be described in more detail hereinafter, the cooperation of the surfaces 35 and 36 creates interference-type joints between the insert 3 and the pocket 5 that effectively stops the insert 3 from rotating within the pocket 5 during a milling operation. The specific geometrical characteristics of the surfaces 35, 36 will now be described in detail.

With specific reference to FIG. 3, each of the curved stop surfaces 35 in the sidewall 21 of the insert 3 includes a pair of mirror-symmetrical oblique engagement portions 37a,b for forming an interference-type joint with the anti-rotation surface 36 of the pocket 5. The upper and lower limits of each stop surface 35 is defined by a top end 39, and a bottom end 41. The central portion 43 of each stop surface 35 is gently tapered so that the depth of the stop surface 35 gently increases between the top and bottom ends 39, 41. In one embodiment, the angle of taper A is approximately 15°. Such tapering advantageously reduces the amount of material that must be removed from the body of the insert 3 in order to form the stop surfaces 35. Finally, each of the stop surfaces 35 is defined by side edges 45a,b formed by mirror-symmetrical S-type curves between top and bottom ends 39, 41 of each surface 35. Due to the uniform sizing and angular spacing of the stop surfaces 35, a combination of the mirror-symmetrical S-curves forming the side edges 45a,b of the stop surfaces 35 creates a continuous sinusoidal curve around the circumference of the sidewall 21 of the insert 3.

Figure 4:
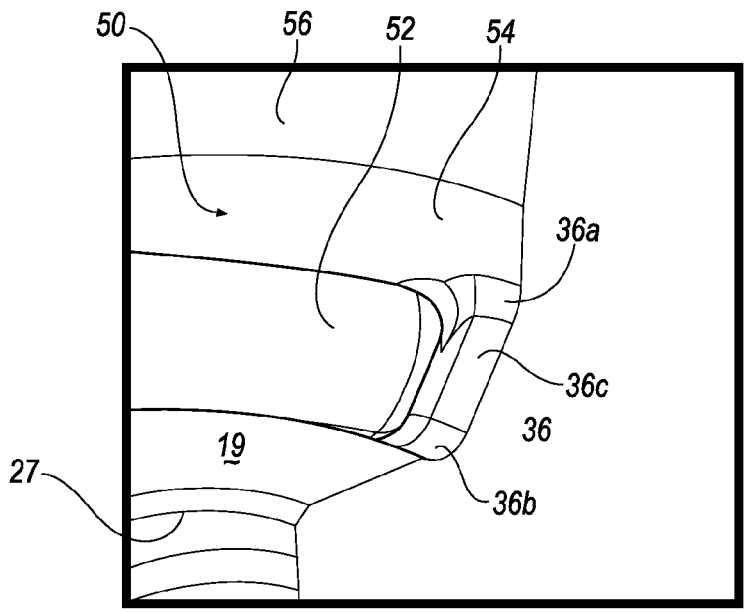
FIG. 4 is a cross-sectional view of the anti-rotation feature formed in the insert-receiving pocket taken along line 4-4 of FIG. 2A.
Figure 5:
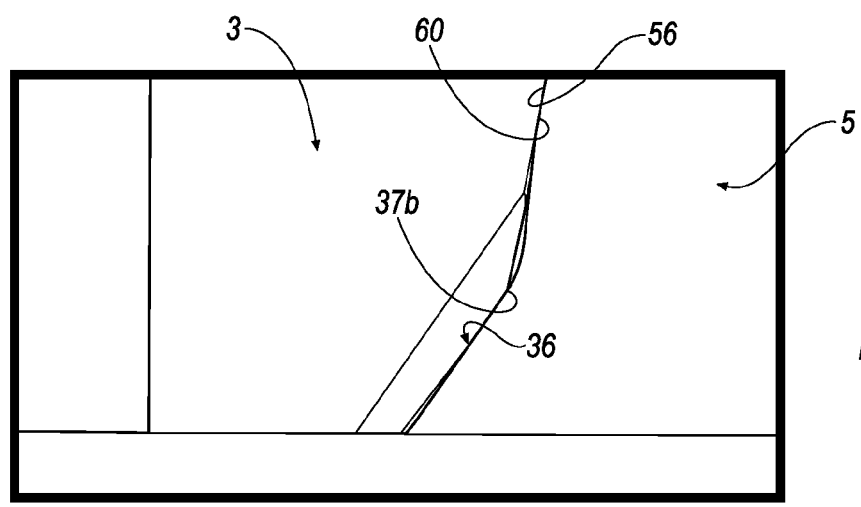
FIG. 5 is an enlarged view illustrating the interaction between the curved stop surfaces of the insert and the anti-rotation feature of the pocket.

With reference now to FIGS. 2A, 4 and 5, the insert-receiving pocket 5 includes a side surface 50 having a lower portion 52, an intermediate portion 54, an upper portion 56 for directly contacting the upper sidewall 64 of the insert 3, and a concave relief 57. Such supporting contact between the upper portion 56 of pocket side surface 50 and upper sidewall 64 of the insert 3 is important for two reasons. First, the broad area of semicircular contact between the side surface 50 of the pocket 5 and the upper portion 60 of the insert sidewall 21 absorbs the majority of the transverse, vibratory loads that are applied to the insert 3 during a cutting operation which in turn insulates the anti-rotation mounting mechanism 1 from such loads. Secondly, such an arrangement focuses the majority of such transverse vibrations onto the strongest part of the insert 3, i.e., the upper sidewall 64, where the diameter of the insert is maximized and where little or no material has been removed for the provision of the curved stop surfaces 35.

One aspect of the invention is that the lower portion 52 of the side surface 50 includes the anti-rotation surface 36 integrally formed with the pocket 5, which cooperates with the curved stop surfaces 35 of the insert 3 to prevent unwanted rotation of the insert 3 when mounted in the pocket 5. The anti-rotation surface 36 includes a pair of opposing curved engagement portions 36a,b separated by a central planar portion 36c. The curved engagement portions 36a,b are designed to engage the engagement portions 37a,b of the stop surfaces 35 of the insert 3, while the planar central portion 36c of the anti-rotation surface 36 does not engage the stop surfaces 35 of the insert 3.

Figure 6:
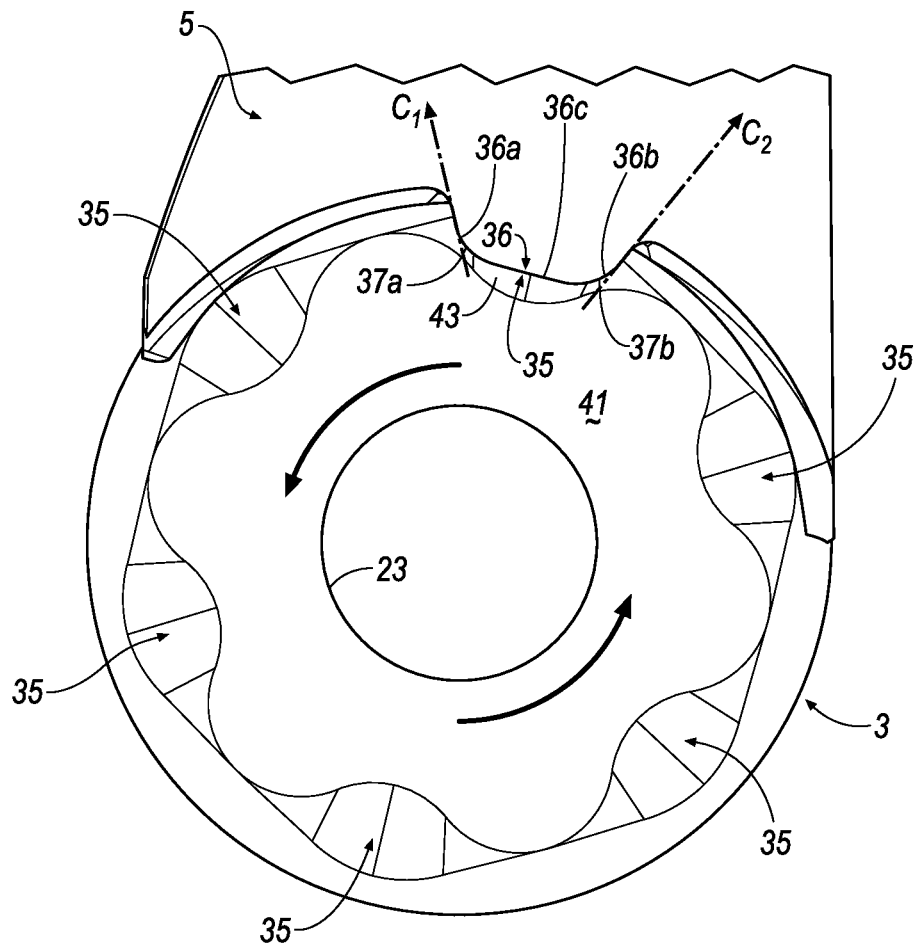
FIG. 6 is a bottom view of the insert mounted in the insert-receiving pocket.
Figure 7:
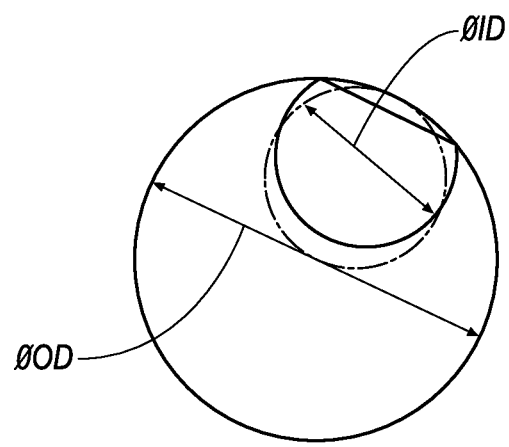
FIG. 7 is a schematic view of the interaction principle between the anti-rotation feature with a planar central portion and the curved stop surface of the insert according to the invention.
Figure 8A:
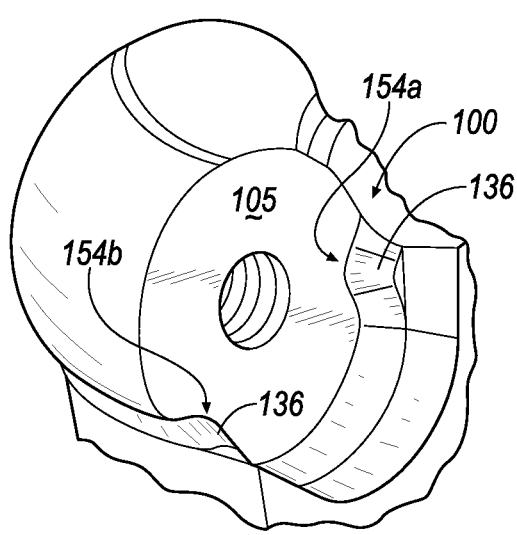
FIGS. 8A and 8B are perspective views of both the insert-receiving pocket and the cutting insert used in a conventional milling cutter.
Figure 8B:
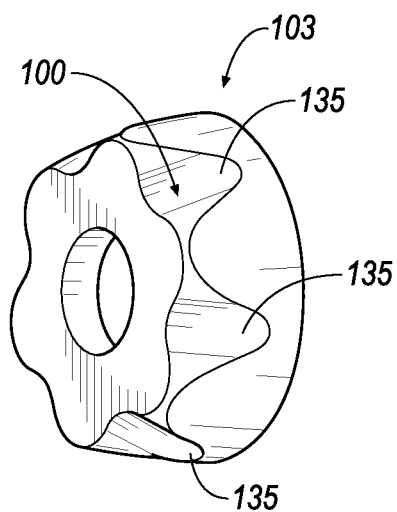
Figure 9:
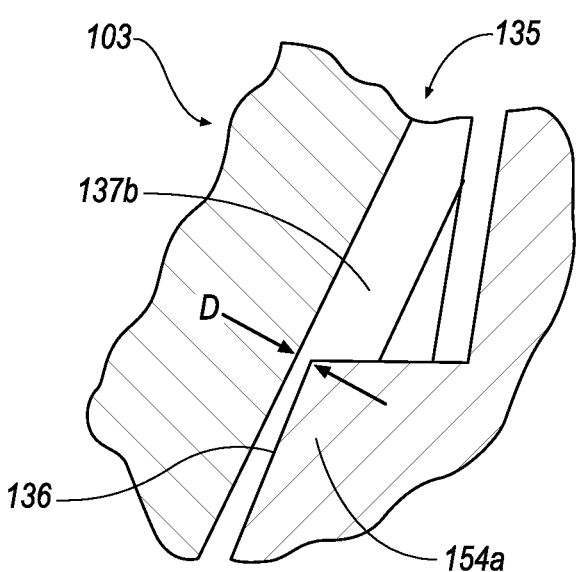
FIG. 9 is an enlarged cross-sectional side view of the insert of FIG. 8B mounted in the pocket of FIG. 8A illustrating the spacing distance D deliberately left between the curved stop surfaces of the insert and the anti-rotation surfaces of the pocket so as to allow a small degree of relative rotation therebetween.

The operation of the anti-rotation mechanism 1 may be understood with respect to FIGS. 5, 6, and 7. Referring now to FIG. 7, the inventive principle of the invention will now be described. The central planer surface 36c is placed on the side of the I.D. that is closest to the O.D. Then, move the I.D. towards the O.D. The I.D. will contact the O.D. in two places. This interaction is similar to the interaction between the cutting insert 3 and the insert-receiving pocket 5 of the anti-rotation mechanism of the invention. The central planar surface 36c on the anti-rotation surface 36 of the pocket 5 allows the anti-rotation surface 36 of the pocket 5 to move deeper into the cutting insert 3, as shown in FIG. 6. Because the center of rotation of the cutting insert 3 is different from the center of the anti-rotation surface 36 of the pocket 5, the arc length of rotation is shortened, thereby allowing the amount of clocking of the cutting insert 3 to be selectively adjusted when mounted in the insert-receiving pocket 5.

In addition, the very small latitude of rotational movement allows the oblique engagement portions 37a,b of the stop surfaces 35 to come into contact with the engagement portions 36a,b of the anti-rotation surface 36, as is illustrated in FIGS. 5 and 6. However, the central planar portion 36c does not come into contact with the stop surfaces 35. In the context of this application, the previously mentioned "oblique" contact refers to the fact that a line $C_1$, $C_2$ drawn tangent to the engagement portions 36a, 37a traverses the outer circumference of the circular cutting edge 15 at an angle that is non-orthogonal to the outer circumference of the round cutting insert 3.

The relatively gently sloping, large partial radius curves that define the stop surfaces 35 on the cutting insert 3 and engagement portions 36a, 36b of the anti-rotation surface 36 on the pocket 5 advantageously results in broad line or lenticular contact between the insert 3 and the pocket 5. This broad line or lenticular contact tends to dissipate the contact forces that occur between the cutting insert 3 and the pocket 5 radially toward the lower portion 52 of the pocket side surface 50 so that the engagement portions 37a,b of the cutting insert 3 do not tend to be sheared or worn off over time. The absorption of most of the transverse vibratory load between the insert 3 and the pocket 5 at the contact interface 62 between the insert upper sidewall 64 and the upper portion 60 of the pocket side surface 50, in combination with the broad and oblique contact between the insert 3 and pocket 5 results in an anti-rotation mechanism 1, which not only prevents the insert from cracking or chipping due to point type stresses induced therein during a cutting operation, but which further reduces wear between the pocket 5, and the hard carbide material which forms the insert 3.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. An anti-rotation mounting mechanism between a round cutting insert and an insert-receiving pocket of a tool body, said insert including an upper surface that terminates in a cutting edge, a lower surface, and a side surface between said upper and lower surfaces, the mechanism comprising:
 a plurality of curved stop surfaces disposed around the side surface of the cutting insert; and
 an anti-rotation surface on the insert-receiving pocket of the tool body for engaging the stop surfaces to form an interference joint, the anti-rotation surface including a pair of curved engagement portions separated by a planar central portion,
 wherein the pair of curved engagement portions engage the curved stop surfaces of the cutting insert when the cutting insert is mounted in the insert-receiving pocket, and
 wherein the planar central portion does not engage the curved stop surfaces of the cutting insert when the cutting insert is mounted in the insert-receiving pocket, and
 wherein the planar central portion allows the anti-rotation surface of the pocket to move radially inward with respect to the cutting insert, resulting in an arc length of rotation to be shortened, thereby allowing an amount of clocking of the cutting insert to be selectively adjusted when the cutting insert is mounted in the insert-receiving pocket.

2. The anti-rotation mounting mechanism of claim 1, wherein the cutting edge of said insert is rounded.

3. The anti-rotation mounting mechanism of claim 1, wherein the anti-rotation surface is integrally formed in a lower portion of a side surface of the pocket, and wherein the pocket includes an upper portion for engaging and supporting the side surface of the insert.

4. The anti-rotation mounting mechanism of claim 1, wherein the curved stop surfaces are concave, and the engagement portions of the anti-rotation surface is convex.

5. The anti-rotation mounting mechanism of claim 4, wherein the curved stop surfaces are equidistantly disposed around the side surface of the insert.

6. The anti-rotation mounting mechanism of claim 1, wherein the side surface of the insert includes a sinusoidal profile that defines the stop surfaces.

7. The anti-rotation mounting mechanism of claim 1, wherein the engagement portions of the anti-rotation surface are complementary in shape to each of the curved stop surfaces.

8. The anti-rotation mounting mechanism of claim 1, comprising only a single anti-rotation surface in the insert-receiving pocket for engaging a single stop surface of the insert.

9. An anti-rotation mounting mechanism between a round insert and an insert-receiving pocket of a tool body, said insert including an upper surface that terminates in a rounded cutting edge, a lower surface, and a side surface between said upper and lower surfaces, the mechanism comprising:

a plurality of curved stop surfaces disposed around the side surface of the insert, each stop surface including a pair of oblique engagement portions and a central portion therebetween; and an anti-rotation surface on a side surface of the pocket of the tool body, the anti-rotation surface including a pair of curved engagement portions separated by a central planar portion, wherein the pair of curved engagement portions engage the curved stop surfaces of the cutting insert when the cutting insert is mounted in the insert-receiving pocket, and wherein the planar central portion does not engage the curved stop surfaces of the cutting insert when the cutting insert is mounted in the insert-receiving pocket, and wherein the planar central portion allows the anti-rotation surface of the pocket to move radially inward with respect to the cutting insert, resulting in an arc length of rotation to be shortened, thereby allowing an amount of clocking of the cutting insert to be selectively adjusted when the cutting insert is mounted in the insert-receiving pocket.

10. The anti-rotation mounting mechanism of claim 9, wherein the anti-rotation surface is integrally formed in a lower portion of a side surface of the pocket, and wherein the pocket includes an upper portion for engaging and supporting the side surface of the insert.

11. The anti-rotation mounting mechanism of claim 9, wherein the curved stop surfaces are concave, and the engagement portions of the anti-rotation surface is convex.

12. The anti-rotation mounting mechanism of claim 11, wherein the curved stop surfaces are equidistantly disposed around the side surface of the insert.

13. The anti-rotation mounting mechanism of claim 9, wherein the side surface of the insert includes a sinusoidal profile that defines the stop surfaces.

14. The anti-rotation mounting mechanism of claim 9, wherein the engagement portions of the anti-rotation surface are complementary in shape to each of the curved stop surfaces.

15. The anti-rotation mounting mechanism of claim 9, comprising only a single anti-rotation surface in the insert-receiving pocket for engaging a single stop surface of the insert.

* * * * *

UNITED STATES PATENT AND TRADEMARK OFFICE
CERTIFICATE OF CORRECTION

PATENT NO. : 8,882,402 B2  
APPLICATION NO. : 13/301945  
DATED : November 11, 2014  
INVENTOR(S) : Brad Daniel Hoffer It is certified that error appears in the above-identified patent and that said Letters Patent is hereby corrected as shown below:

IN THE SPECIFICATION

In Column 1, Lines 24-25, delete "frustro-conical" and insert -- frusto-conical --, therefor.

In Column 4, Line 45, delete "frustro-conical" and insert -- frusto-conical --, therefor.

In Column 4, Line 57, delete "frustro-conical" and insert -- frusto-conical --, therefor.

Signed and Sealed this  
Thirty-first Day of March, 2015

Michelle K. Lee  
*Director of the United States Patent and Trademark Office*